(12) United States Patent (10) Patent No.: US 12,649,358 B2

Tokarz (45) Date of Patent: Jun. 9, 2026

(54) ELECTRICAL DISTRIBUTION SYSTEM ROUTED THROUGH SUB-FRAME

(71) Applicant: Ford Global Technologies, LLC, Dearborn, MI (US)

(72) Inventor: Nicholas Tokarz, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 18/423,783

(22) Filed: Jan. 26, 2024

(65) Prior Publication Data

US 2025/0242677 A1 Jul. 31, 2025

(51) Int. Cl.
| | |
|---|---|
| *B60K 1/00* | (2006.01) |
| *B60K 1/04* | (2019.01) |
| *B62D 21/17* | (2006.01) |

(52) U.S. Cl.
CPC ................ *B60K 1/04* (2013.01); *B62D 21/17* (2013.01); *B60K 2001/0416* (2013.01); *B60K 2001/0438* (2013.01)

(58) Field of Classification Search
CPC .............. B60K 1/04; B60K 2001/0416; B60K 2001/0438; B60K 1/00; B60R 16/0207; B60R 16/0215; B62D 21/17; B60D 21/11
See application file for complete search history.

(56) References Cited

U.S. PATENT DOCUMENTS

| | | | |
|---|---|---|---|
| 5,091,604 A | 2/1992 | Kirma | |
| 7,563,981 B2 | 7/2009 | Ichikawa et al. | |
| 7,850,191 B1 | 12/2010 | Kaminski et al. | |
| 8,617,687 B2 | 12/2013 | McCarville et al. | |
| 8,668,253 B2 | 3/2014 | Bauer | |
| 10,023,137 B2 | 7/2018 | Chinavare et al. | |
| 10,142,836 B2 | 11/2018 | Block | |
| 10,390,331 B2 | 8/2019 | Adajakple et al. | |
| 11,001,305 B2 | 5/2021 | Bremmer et al. | |
| 11,247,573 B2 * | 2/2022 | Yamanaka | .............. B60L 50/64 |
| 2003/0230443 A1 | 12/2003 | Cramer et al. | |
| 2006/0026017 A1 | 2/2006 | Walker | |
| 2009/0242312 A1 * | 10/2009 | Oshima | .................... B62J 11/19 |
| | | | 180/312 |
| 2011/0088944 A1 | 4/2011 | Ogue et al. | |

(Continued)

FOREIGN PATENT DOCUMENTS

| | | |
|---|---|---|
| DE | 4115568 A1 | 2/1993 |
| DE | 112011105218 B4 | 12/2019 |
| DE | 102021114787 A1 | 1/2022 |

(Continued)

OTHER PUBLICATIONS

Pawlik, D. (Jan. 12, 2018). Sorting Busbar choices for electric vehicle power distribution. Battery Power Online l. https://www.batterypoweronline.com/articles/sorting-busbar-choices-for-electric-vehicle-power-distribution/.

*Primary Examiner* — Marc Q Jimenez
*Assistant Examiner* — James J Triggs
(74) *Attorney, Agent, or Firm* — David B. Kelley; Carlson, Gaskey & Olds, P.C.

(57) ABSTRACT

In some aspects, the techniques described herein relate to a motor vehicle including a sub-frame, an electric machine mounted to the sub-frame, and an electrical distribution system electrically coupled to the electric machine. In particular, the electrical distribution system is routed at least partially through the sub-frame.

20 Claims, 2 Drawing Sheets

(56)　　　　　　　References Cited

U.S. PATENT DOCUMENTS

| 2013/0206496 | A1 | 8/2013 | Hashimoto |
| 2022/0089237 | A1 | 3/2022 | Sverdlov et al. |

FOREIGN PATENT DOCUMENTS

| EP | 1958843 | A1 | 8/2008 |
| JP | 2009171841 | A | 7/2009 |
| WO | 03029922 | A2 | 4/2003 |

* cited by examiner

ELECTRICAL DISTRIBUTION SYSTEM ROUTED THROUGH SUB-FRAME

TECHNICAL FIELD

This disclosure relates generally to an electrical distribution system for an electrified vehicle, and more particularly to an electrical distribution system routed through a sub-frame of the electrified vehicle.

BACKGROUND

A high voltage traction battery pack typically powers the electric machines and other electrical loads of an electrified vehicle. The traction battery pack includes a plurality of battery cells.

SUMMARY

In some aspects, the techniques described herein relate to a motor vehicle, including: a sub-frame; an electric machine mounted to the sub-frame; and an electrical distribution system electrically coupled to the electric machine, wherein the electrical distribution system is routed at least partially through the sub-frame.

In some aspects, the techniques described herein relate to a motor vehicle, wherein the sub-frame is made of metallic material.

In some aspects, the techniques described herein relate to a motor vehicle, wherein the electrical distribution system includes a line.

In some aspects, the techniques described herein relate to a motor vehicle, wherein the line is embedded within the sub-frame.

In some aspects, the techniques described herein relate to a motor vehicle, wherein the sub-frame includes an interior channel, and the line is routed through the interior channel.

In some aspects, the techniques described herein relate to a motor vehicle, wherein the interior channel is formed at least in part by stamping a first piece of metal.

In some aspects, the techniques described herein relate to a motor vehicle, wherein a second piece of metal is connected to the first piece of metal to enclose the interior channel.

In some aspects, the techniques described herein relate to a motor vehicle, wherein the line is not wrapped in an electromagnetic interference shield.

In some aspects, the techniques described herein relate to a motor vehicle, wherein the line is an electrical cable.

In some aspects, the techniques described herein relate to a motor vehicle, wherein the line is a bus bar.

In some aspects, the techniques described herein relate to a motor vehicle, further including: a first component; and a second component electrically coupled to the first component by way of the electrical distribution system.

In some aspects, the techniques described herein relate to a motor vehicle, wherein the first component is a battery pack and the second component is the electric machine.

In some aspects, the techniques described herein relate to a motor vehicle, wherein the motor vehicle is an electrified vehicle.

In some aspects, the techniques described herein relate to a motor vehicle, wherein the sub-frame is attached to a frame of the motor vehicle.

In some aspects, the techniques described herein relate to a method, including: supplying power to or from an electric machine of a motor vehicle via an electrical distribution system, the electrical distribution system at least partially routed through a sub-frame supporting the electric machine.

In some aspects, the techniques described herein relate to a method, wherein the sub-frame is made of metallic material.

In some aspects, the techniques described herein relate to a method, wherein the electrical distribution system includes a line.

In some aspects, the techniques described herein relate to a method, wherein the line is not wrapped in an electromagnetic interference shield.

In some aspects, the techniques described herein relate to a method, wherein the line is embedded within the sub-frame.

In some aspects, the techniques described herein relate to a method, wherein the sub-frame includes an interior channel, and the line is routed through the interior channel.

DETAILED DESCRIPTION

This disclosure relates generally to an electrical distribution system for an electrified vehicle, and more particularly to an electrical distribution system routed through a sub-frame of the electrified vehicle. Among other benefits, the sub-frame acts as a natural Faraday cage for the electrical distribution system, while also reducing the number of component parts, because a separate insulating shield is not required for the portion of the electrical distribution system that is routed through the sub-frame. These and other features are discussed in greater detail in the following paragraphs of this detailed description.

Figure 1:
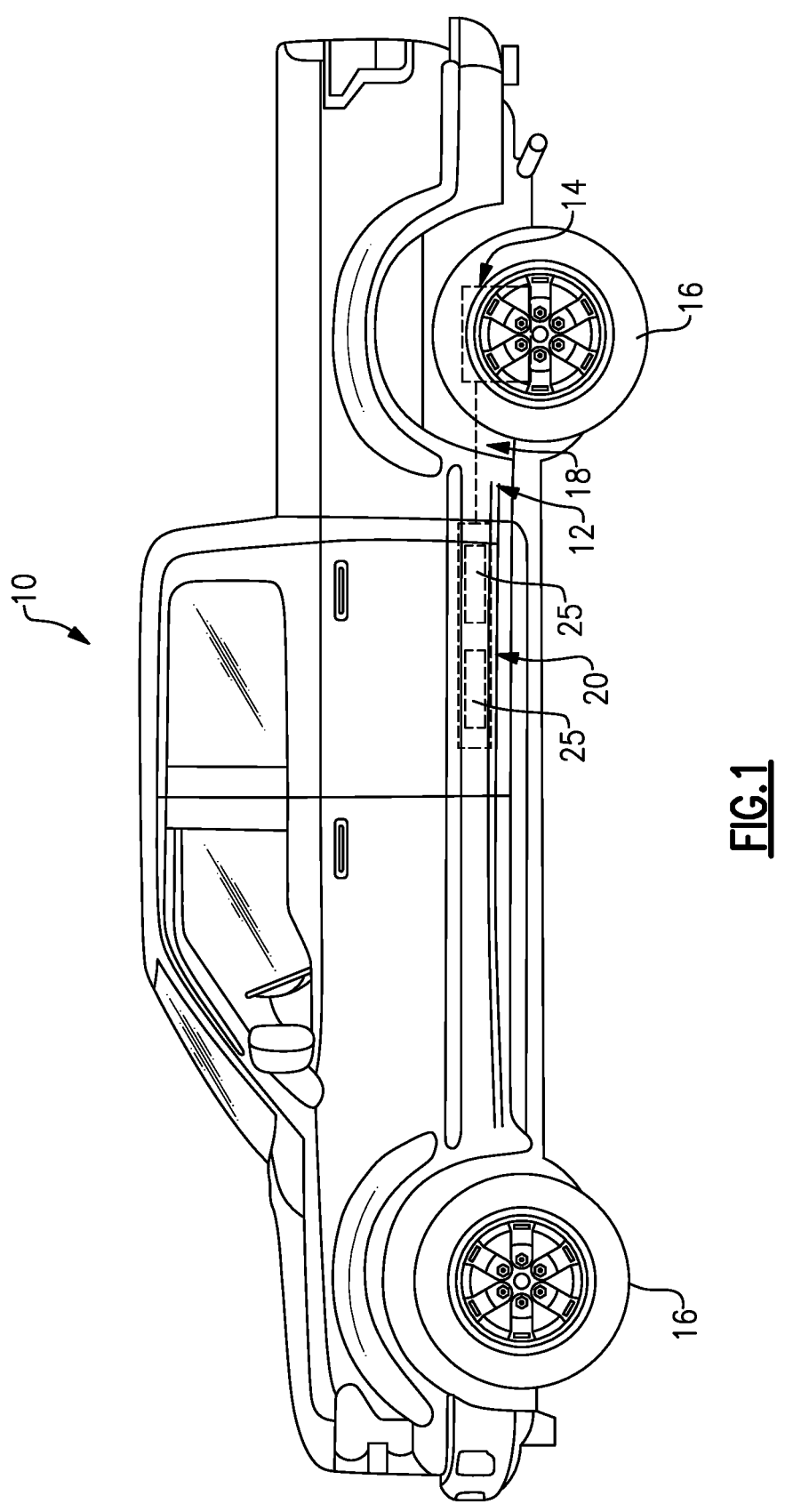
FIG. 1 schematically illustrates an electrified vehicle.

FIG. 1 schematically illustrates a motor vehicle, which in this example is an electrified vehicle 10. The electrified vehicle 10 may include any type of electrified powertrain.

FIG. 1 schematically illustrates an electrified vehicle 10 that includes an electrified drive system 12. In an embodiment, the electrified vehicle 10 is a battery electric vehicle (BEV). In another embodiment, the electrified vehicle 10 is a hybrid electric vehicle (HEV) or a plug-in hybrid electric vehicle (PHEV). Therefore, although not shown in this embodiment, the electrified vehicle 10 could be equipped with an internal combustion engine that can be employed either alone or in combination with other energy sources to propel the electrified vehicle 10.

In the illustrated embodiment, the electrified vehicle 10 is a full electric vehicle propelled solely through electric power, such as by one or more electric machines 14, without any assistance from an internal combustion engine. The electric machine 14 may operate as an electric motor, an electric generator, or both. The electric machine 14 receives electrical power and provides a rotational output torque to one or more drive wheels 16.

The electrified vehicle 10 includes an electrical distribution system (sometimes abbreviated "EDS") 18. The electrical distribution system 18 is configured to electrically couple certain electrical components of the electrified vehicle 10 to one another. In FIG. 1, the electrical distribution system 18 electrically connects the electric machine 14 to a battery pack 20. In FIG. 1, the electrical distribution system 18 is shown schematically. It should be understood that the electrical distribution system 18 may include one or more electrical wires, electrical cables, bus bars (sometimes spelled "busbars"), electrical connectors, etc., as necessary to electrically couple electrical components to one another.

The battery pack 20 is an exemplary electrified vehicle battery. The battery pack 20 may be a high voltage traction battery pack that includes a plurality of battery arrays 25 (i.e., battery assemblies or groupings of rechargeable battery cells) capable of outputting electrical power to operate the electric machine 14 and/or other electrical loads of the electrified vehicle 10. Other types of energy storage devices and/or output devices can also be used to electrically power the electrified vehicle 10.

In an embodiment, the electrified vehicle 10 is a pickup truck. However, the electrified vehicle 10 could also be a car, a van, a sport utility vehicle, or any other type of vehicle. Although a specific component relationship is illustrated in the figures of this disclosure, the illustrations are not intended to limit this disclosure. The placement and orientation of the various components of the electrified vehicle 10 are shown schematically and could vary within the scope of this disclosure.

Figures 2, 3:
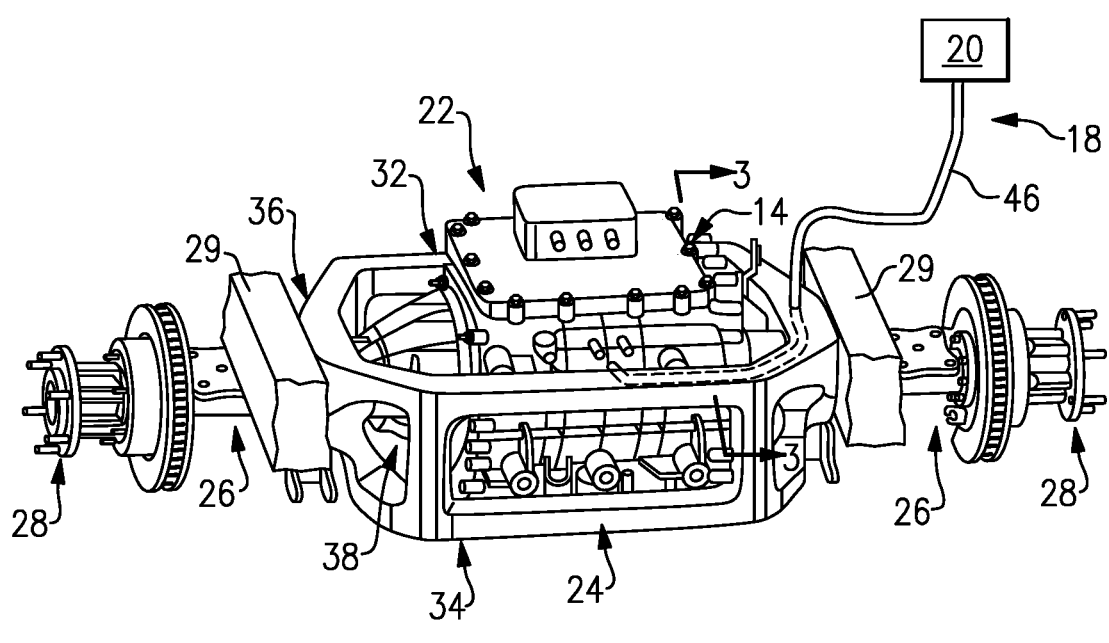
FIG. 2 illustrates an assembly of a drive system of the electrified vehicle of FIG. 1.
FIG. 3 is a cross-sectional view of a portion of the sub-frame of FIG. 2.

FIG. 2 illustrates an exemplary axle assembly 22 of the drive system 12 of the electrified vehicle 10 of FIG. 1. In an embodiment, the axle assembly 22 is a rear axle assembly of the electrified vehicle 10. In another embodiment, the axle assembly 22 is a front axle assembly of the electrified vehicle 10. In yet another embodiment, both front and rear axles of the drive system 12 could each employ the axle assembly 22. Stated another way, the electrified vehicle 10 could be a rear wheel drive vehicle, a front wheel drive vehicle, or an all-wheel drive vehicle.

The axle assembly 22 may include, among other things, a sub-frame 24, the electric machine 14, a pair of shaft housings 26, and a pair of axle shafts 28.

The sub-frame 24 may function as a cradle of the axle assembly 22 and is configured for mounting the electric machine 14. In this example, the sub-frame 24 is made of metallic material. The size, shape, material make-up, and overall configuration of the sub-frame 24 are not intended to limit this disclosure. This disclosure extends to sub-frames that are not cradles for axle assemblies. The sub-frame 24 may include one or more parts.

The sub-frame 24 is a frame to which the electric machine 14 is mounted. The sub-frame 24 is, in turn, connected to the frame of the electrified vehicle 10, such as by being to frame rails 29, as shown in FIG. 3.

The sub-frame 24 may include a top frame 32, a bottom frame 34, and opposing side walls 36. The top frame 32, the bottom frame 34, and the side walls 36 of the sub-frame 24 establish an open space 38 for accommodating the electric machine 14.

In this disclosure, the electrical distribution system 18 is routed at least partially through the sub-frame 24. In this example, the electrical distribution system 18 includes a line 46, which is shown partially in phantom in FIG. 2, routed at least partially through the sub-frame 24. The line 46 may be an electrical wire, electrical cable, a bundle of wires or cables, or a bus bar, as examples. The line 46 is configured to distribute power between the battery pack 20 and the electric machine 14.

FIG. 3 illustrates a portion of the sub-frame 24, and namely the top frame 32, in cross-section. As shown, the sub-frame 24 includes an interior channel 50. The interior channel 50 is formed between a first piece of metal 52 and a second piece of metal 54. The first piece of metal 52 is formed into a substantial U-shape in cross-section, in this example, using a process such as stamping. The second piece of metal 54 is substantially flat and is attached to the first piece of metal 52 to enclose the interior channel 50. The second piece of metal 54 may be attached to the first piece of metal 52 using a process such as welding. Because the sub-frame 24, and namely the top frame 32, is made of metallic material, it acts as a natural Faraday cage for the line 46. As a result, in a particular example, the line 46 is not wrapped in an electromagnetic interference shield. The interior channel 50 could be formed using a process other than stamping and welding, such as by forming the sub-frame 24 using additive manufacturing or investment casting, as examples. While not shown, the sub-frame 24 may include openings permitting the electrical distribution system 18, namely the line 46, to route through the interior channel 50.

While in FIG. 3 the line 46 is routed through an interior channel 50 of the sub-frame 24, the line 46 could be routed at least partially through the sub-frame 24 according to other techniques. One such technique includes embedding at least a portion of the line 46 into the sub-frame 24, such as during formation of the sub-frame 24, including during a casting or molding process used to form the sub-frame 24. This may involve placing the line 46 in a mold and then pouring or injecting molten metal around it, allowing the metal to solidify and encase the line 46.

It should be understood that terms such as "about," "substantially," and "generally" are not intended to be boundaryless terms, and should be interpreted consistent with the way one skilled in the art would interpret those terms. It should also be understood that directional terms such as "upper," "top," "vertical," "forward," "rear," "side," "above," "below," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising: a sub-frame, wherein the sub-frame provides a cradle of an axle assembly, and wherein the sub-frame extends between first and second frame rails of the motor vehicle; an electric machine mounted to the sub-frame, wherein the axle assembly includes the electric machine; an electrical distribution system electrically coupled to the electric machine, wherein the electrical distribution system is routed at least partially through the sub-frame; and a battery pack, wherein the electric machine is electrically coupled to the battery pack by way of the electrical distribution system.

2. The motor vehicle as recited in claim 1, wherein the sub-frame is made of metallic material.

3. The motor vehicle as recited in claim 1, wherein the electrical distribution system includes a line.

4. The motor vehicle as recited in claim 3, wherein the line is embedded within the sub-frame.

5. The motor vehicle as recited in claim 3, wherein the sub-frame includes an interior channel, and the line is routed through the interior channel.

6. The motor vehicle as recited in claim 5, wherein the interior channel is formed at least in part by stamping a first piece of metal.

7. The motor vehicle as recited in claim 6, wherein a second piece of metal is connected to the first piece of metal to enclose the interior channel.

8. The motor vehicle as recited in claim 3, wherein the line is not wrapped in an electromagnetic interference shield.

9. The motor vehicle as recited in claim 3, wherein the line is an electrical cable or a bus bar.

10. The motor vehicle as recited in claim 1, further comprising:

a battery pack, wherein the electric machine is electrically coupled to the battery pack by way of the electrical distribution system.

11. The motor vehicle as recited in claim 1, wherein the motor vehicle is an electrified vehicle.

12. The motor vehicle as recited in claim 1, wherein the sub-frame is attached to a frame of the motor vehicle.

13. A method, comprising:

supplying power to or from an electric machine of a motor vehicle via an electrical distribution system, the electrical distribution system at least partially routed through a sub-frame supporting the electric machine.

14. The method as recited in claim 13, wherein the sub-frame is made of metallic material.

15. The method as recited in claim 13, wherein the electrical distribution system includes a line.

16. The method as recited in claim 15, wherein the line is not wrapped in an electromagnetic interference shield.

17. The method as recited in claim 15, wherein either the line is embedded within the sub-frame, or wherein the line is routed through sub-frame an interior channel of the sub-frame.

18. An assembly for a motor vehicle, comprising: a sub-frame connected to a first frame rail extending along a first side of the motor vehicle and connected to a second frame rail extending along a second side of the motor vehicle opposite the first side, wherein the sub-frame provides a cradle of an axle assembly; a pair of shaft housings arranged on opposite sides of the sub-frame;

a pair of axle shafts arranged on opposite sides of the sub-frame; an electric machine mounted to the sub-frame; and an electrical distribution system electrically coupled to the electric machine, wherein the electrical distribution system is routed at least partially through the sub-frame.

19. The assembly as recited in claim 18, wherein:

the sub-frame includes a first side wall adjacent the first frame rail, a second side wall adjacent the second frame rail, a top frame extending between the first side wall and the second side wall, and a bottom frame extending between the first side wall and the second side wall, and the top frame, bottom frame, first side wall, and second side wall establish an open space in which the electric machine is arranged.

20. The assembly as recited in claim 19, wherein a line of the electrical distribution system is routed at least partially through an interior channel of the top frame.

* * * * *